US008555160B2

(12) United States Patent
Hattori

(10) Patent No.: US 8,555,160 B2
(45) Date of Patent: Oct. 8, 2013

(54) APPARATUS AND METHODS FOR CREATING AND/OR EDITING COLOR-IMAGE PROCESSING FILES

(75) Inventor: Mitsuaki Hattori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1079 days.

(21) Appl. No.: 12/053,036

(22) Filed: Mar. 21, 2008

(65) Prior Publication Data

US 2008/0244374 A1   Oct. 2, 2008

(30) Foreign Application Priority Data

Mar. 27, 2007   (JP) .................................. 2007-082748
Dec. 28, 2007   (JP) .................................. 2007-341120

(51) Int. Cl.
*G06F 17/24* (2006.01)
(52) U.S. Cl.
USPC .......................................... 715/255; 382/162
(58) Field of Classification Search
USPC ........ 345/600, 601, 602; 348/231.6; 396/211; 707/695; 715/255, 275; 382/162
See application file for complete search history.

(56) References Cited

U.S. PATENT DOCUMENTS

| | | | | |
|---|---|---|---|---|
| 5,062,045 | A * | 10/1991 | Janis et al. ..................... | 707/648 |
| 5,155,850 | A * | 10/1992 | Janis et al. ..................... | 707/633 |
| 5,184,169 | A * | 2/1993 | Nishitani ....................... | 396/211 |
| 5,845,044 | A * | 12/1998 | Iizuka et al. .................. | 386/227 |
| 6,094,221 | A * | 7/2000 | Andersion .................. | 348/231.6 |
| 6,333,752 | B1 * | 12/2001 | Hasegawa et al. ............ | 715/764 |
| 6,493,028 | B1 * | 12/2002 | Anderson et al. .......... | 348/222.1 |
| 6,862,040 | B1 * | 3/2005 | Sawachi ..................... | 348/231.3 |
| 6,968,058 | B1 | 11/2005 | Kondoh | |
| 7,062,497 | B2 * | 6/2006 | Hamburg et al. ..................... | 1/1 |
| 7,536,672 | B1 * | 5/2009 | Ruehle .......................... | 717/101 |
| RE40,865 | E * | 8/2009 | Anderson .................. | 348/231.6 |
| 7,900,142 | B2 * | 3/2011 | Baer .............................. | 715/255 |
| 8,141,166 | B2 * | 3/2012 | Charlton ......................... | 726/27 |
| 2004/0218065 | A1 * | 11/2004 | Schinner ................... | 348/231.6 |
| 2005/0063585 | A1 | 3/2005 | Matsuura | |
| 2006/0230459 | A1 * | 10/2006 | Lam ............................... | 726/26 |
| 2008/0215509 | A1 * | 9/2008 | Charlton ........................ | 706/11 |
| 2011/0187897 | A1 * | 8/2011 | Nakajima .................. | 348/231.6 |

FOREIGN PATENT DOCUMENTS

| | | |
|---|---|---|
| EP | 0675648 A2 | 10/1995 |
| EP | 1058450 A1 | 12/2000 |
| JP | 2003-333417 A | 11/2003 |
| JP | 2005-212137 A | 8/2005 |
| JP | 2006-121321 A | 5/2006 |
| JP | 2007-053635 A | 3/2007 |

OTHER PUBLICATIONS

Camarda, Bill. "Special Edition Using Microsoft Office Word 2003". Dec. 12, 2003, Que.*

(Continued)

*Primary Examiner* — Cesar Paula
*Assistant Examiner* — Tyler J Schallhorn
(74) *Attorney, Agent, or Firm* — Carter, DeLuca, Farrell & Schmidt, LLP

(57) ABSTRACT

A file editing apparatus is provided that edits a color-image processing file in which limitations can be imparted on the display of edit history information that corresponds to a new shooting mode. The apparatus includes an editing unit that edits a color processing file; a display control unit; and a storage unit that stores the color-image processing file including edit history information of the color processing file edited by the editing unit, and edit history display control information for the display control unit to control display of the edit history information.

14 Claims, 10 Drawing Sheets

| MATRIX OPERATION COEFFICIENTS FOR CREATING 3D-LUT | | | | |
|---|---|---|---|---|
| EDIT HISTORY 1 | EDIT HISTORY DISPLAY / HIDE INFORMATION 1 | USER ID 1 | PASSWORD 1 | |
| EDIT HISTORY 2 | EDIT HISTORY DISPLAY / HIDE INFORMATION 2 | USER ID 2 | PASSWORD 2 | |
| • | • | • | • | |
| • | • | • | • | |
| • | • | • | • | |
| EDIT HISTORY N | EDIT HISTORY DISPLAY / HIDE INFORMATION N | USER ID N | PASSWORD N | |

(56) References Cited

OTHER PUBLICATIONS

Chavez, Conrad. "Working Smart in Adobe Photoshop C52". Sep. 1, 2006.*

"Engineering and Architectural Workflows for Photoshop CS2" Adobe White Paper, 2005, XP007912651 Retrieved from the Internet:URL:http//wwwimages.adobe.com/www.adobe.com/digitalimag/pdfs/aecpsworkflows_wp.pdf.

Jeff Schewe: "About Metadata" Adobe Technical Paper, 2006, XP007912654 Retrieved from the Internet: URL:http//wwwimages.adobe.com/digitalimag/pdfs/phscs2ip_metadata.pdf.

"Optimum strategies for Using Adobe Photoshop CS2 in Scientific and Medical Imaging" Adobe White Paper, 2005, XP002486626.

Japanese Office Action dated Apr. 23, 2012 for JP 2007-341120.

Iwasaki, "Adobe Photoshop 5.5J, Realside Navigation Guide", Real Area STAFF to SecondStep Photoshoper's, pp. 141-153, SOFTBANK Pub. Corp., 1st ed. (Feb. 29, 2000).

* cited by examiner

FIG. 2

| MATRIX OPERATION COEFFICIENTS FOR CREATING 3D-LUT | | | | |
|---|---|---|---|---|
| EDIT HISTORY 1 | EDIT HISTORY DISPLAY / HIDE INFORMATION 1 | USER ID 1 | PASSWORD 1 | |
| EDIT HISTORY 2 | EDIT HISTORY DISPLAY / HIDE INFORMATION 2 | USER ID 2 | PASSWORD 2 | |
| ⋮ | ⋮ | ⋮ | ⋮ | |
| EDIT HISTORY N | EDIT HISTORY DISPLAY / HIDE INFORMATION N | USER ID N | PASSWORD N | |

201 = header row; 202 = data rows

FIG. 5

| PRE-DEVELOPMENT PROCESS PARAMETERS | | | | ~501 |
|---|---|---|---|---|
| MATRIX OPERATION COEFFICIENTS FOR CREATING 3D-LUT | | | | ~502 |
| EDIT HISTORY 1 | EDIT HISTORY DISPLAY / HIDE INFORMATION 1 | USER ID 1 | PASSWORD 1 | ⎫ |
| EDIT HISTORY 2 | EDIT HISTORY DISPLAY / HIDE INFORMATION 2 | USER ID 2 | PASSWORD 2 | ⎬ 503 |
| ⋮ | ⋮ | ⋮ | ⋮ | |
| EDIT HISTORY N | EDIT HISTORY DISPLAY / HIDE INFORMATION N | USER ID N | PASSWORD N | ⎭ |

FIG. 7A

BEFORE ENCRYPTION → AFTER ENCRYPTION

+5

| Before | After |
|---|---|
| 0 | 5 |
| 1 | 6 |
| 2 | 7 |
| 3 | 8 |
| 4 | 9 |
| 5 | A |
| 6 | B |
| 7 | C |
| 8 | D |
| 9 | E |
| A | F |
| B | 0 |
| C | 1 |
| D | 2 |
| E | 3 |
| F | 4 |

ENCRYPTION METHOD FOR ENCRYPTION CONSTANT OF 5

FIG. 7B

BEFORE DECRYPTION → AFTER DECRYPTION

−5

| Before | After |
|---|---|
| 0 | B |
| 1 | C |
| 2 | D |
| 3 | E |
| 4 | F |
| 5 | 0 |
| 6 | 1 |
| 7 | 2 |
| 8 | 3 |
| 9 | 4 |
| A | 5 |
| B | 6 |
| C | 7 |
| D | 8 |
| E | 9 |
| F | A |

DECRYPTION METHOD FOR ENCRYPTION CONSTANT OF 5

APPARATUS AND METHODS FOR CREATING AND/OR EDITING COLOR-IMAGE PROCESSING FILES

BACKGROUND OF THE INVENTION

1. Field of the Invention

The present invention generally relates to a file processing apparatus and method capable of editing image characteristics of a color-image processing file.

2. Description of the Related Art

Image capturing apparatuses, such as digital cameras, that include image processing modes optimized for various scenes to be shot, such as a landscape shooting mode, a portrait shooting mode, and so on, have been proposed. For example, color-image processing that more vividly renders blue skies, trees, and so on is executed in the stated landscape shooting mode, whereas color-image processing that attractively renders the skin tones of the person who is the subject is executed in the portrait shooting mode. Selecting these shooting modes included in the image capturing apparatus makes it possible for a user to obtain image data on which color-image processing optimized for each type of shooting scene has been performed.

However, with regards to such shooting modes, new shooting modes are constantly being developed, resulting in new types of image capturing apparatuses that include these newly-developed shooting modes continuously going on sale. For this reason, even image capturing apparatuses that have been purchased recently do not include newly-developed shooting modes, and thus these apparatuses are, functionally speaking, deficient.

In order to solve this kind of problem, Japanese Patent Laid-Open No. 2003-333417, for example, proposes downloading a color-image processing file that includes a color-image processing program for a new shooting mode via a communication line from a server connected to a network and installing that file in an image capturing apparatus. With an image capturing apparatus including this kind of update function, which utilizes a program or the like, a user can easily shoot images using the latest shooting mode, even after the image capturing apparatus has been purchased, by downloading the color-image processing file for that shooting mode and installing it in that image capturing apparatus.

However, although the technique proposed by Japanese Patent Laid-Open No. 2003-333417 does make it possible to shoot pictures using the latest shooting mode, preferences vary significantly from user to user, and thus all users may not be able to obtain the image they prefer.

A color-image processing file editing apparatus, through which a user can edit the saturation, brightness, and hue of the color, the gamma properties, and other such image processing characteristics determined by the color-image processing file, has therefore been proposed separately from the previously mentioned technique. By using such a color-image processing file editing apparatus to edit color-image processing files by themselves, individual users can create color-image processing files with which image data having image characteristics that fulfill the users' own preferences can be obtained.

Incidentally, a three-dimensional Look Up Table ("3D-LUT" hereinafter) is an example of a means utilized to apply image processing characteristics held by the color-image processing file to the image data itself. With the 3D-LUT, the amount of data that constitutes the file, or in other words, the size of the file, is extremely large. Therefore, using a matrix operation expression that indicates the same characteristics as the 3D-LUT, rather than using the 3D-LUT itself, has been proposed.

Storing only the coefficients of the matrix operation expression (the matrix operation coefficients) in the color-image processing file significantly reduces the amount of data thereof, making it possible to conserve space in a memory included in the image capturing apparatus when the data of the color-image processing file is loaded into that image capturing apparatus.

With regards to such a color-image processing file, in which matrix operation coefficients are stored, it is necessary to store both the matrix operation coefficients and edit history separately from one another in the color-image processing file when editing processing is to be executed using the color-image processing file editing apparatus. Then, when the image processing characteristics of the color-image processing file are to be applied to image data, it is necessary to create a 3D-LUT that incorporates the edit history from the stored matrix operation coefficients and edit history, and apply the created 3D-LUT to the image data. Therefore, with this color-image processing file editing apparatus, it is necessary to retain a history of editing processing as edit history information so that the editing processing can be altered later.

Meanwhile, in the case where an edited color-image processing file is provided to another user, displaying only the history of the editing that user him/herself has performed and not displaying the history of the editing the provider of the file performed makes it easier for the user who has been provided with the color-image processing file to confirm and edit the file. In other words, if plural users have edited the same color-image processing file, it is preferable to hide the edit history aside from the history of the editing a user him/herself has performed. In such a manner, omitting the edit history information from the color-image processing file and storing only the 3D-LUT, with the edit history applied thereto, in the color-image processing file is one way to hide the edit history from third parties.

However, with the color-image processing file described earlier, in which matrix operation coefficients are stored instead of a 3D-LUT in order to reduce the file size, the edit history cannot be applied to the matrix operation coefficients. For this reason, it is necessary to store both the matrix operation coefficients and the edit history information in the color-image processing file. In such a case, it is not possible to distinguish whether or not the edit history information stored in that image processing file is to be displayed.

SUMMARY OF THE INVENTION

It is desirable to address one or more of the foregoing problems. Accordingly, the present invention provides a file editing apparatus, or a corresponding file editing method, that edits a color-image processing file, corresponding to a new shooting mode, capable of imparting a limitation upon the display of edit history information.

According to an aspect of the present invention, there is provided a file processing apparatus for creating and/or editing a color-image processing file representing color processing to be applied to an image. The apparatus includes a generating means for generating edit history information relating to a color-processing change requested by a user and also for generating control information usable to control use of the edit history information; and a recording means for causing both the edit history information and the control information generated by the generating means to be recorded in the color-image processing file.

According to yet another aspect of the present invention, there is provided a file processing apparatus for processing a color-image processing file that represents color processing to be applied to an image, and that includes edit history information relating to a color-processing change, and that also includes control information usable to control use of the edit history information in the file. Here, the apparatus includes a use control means for employing the control information included in the file to control use of the edit history information included in the file.

Moreover, according to another aspect of the present invention, there is provided a file processing method utilized in a file processing apparatus for creating and/or editing a color-image processing file representing color processing to be applied to an image, wherein the apparatus includes a generating means for generating edit history information relating to a color-processing change requested by a user and also for generating control information usable to control use of the edit history information; and a recording means for causing both the edit history information and the control information generated by the generating means to be recorded in the color-image processing file. The method includes generating edit history information relating to a color-processing change requested by a user and also generating control information usable to control use of the edit history information; and causing both the edit history information and the control information generated by the generating means to be recorded in the color-image processing file.

Additionally, according to yet another aspect of the present invention, there is provided a file processing method for processing a color-image processing file that represents color processing to be applied to an image and that includes edit history information relating to a color-processing change and that also includes control information usable to control use of the edit history information in the file. Here, the method includes employing the control information included in the file to control use of the edit history information included in the file.

Furthermore, according to yet another aspect of the present invention, there is provided a computer readable medium containing computer executable instructions and a color-image processing file configured to be used by a color-image processing apparatus to apply color processing represented by the file to an image. The medium includes edit history information relating to a color-processing change; and computer executable instructions and control information usable to control use of the edit history information in the file.

Moreover, according to yet another aspect of the present invention, there is provided a computer-readable storage medium containing computer-executable instructions for performing a program that which, when loaded into a computer, causes the computer to function as a file processing apparatus for creating and/or editing a color-image processing file representing color processing to be applied to an image. Here, the medium includes computer-executable instructions for generating edit history information relating to a color-processing change requested by a user and also for generating control information usable to control use of the edit history information; and computer-executable instructions for causing both the edit history information and the control information generated by the generating means to be recorded in the color-image processing file.

Further features and aspects of the present invention will become apparent from the following description of exemplary embodiments with reference to the attached drawings.

BRIEF DESCRIPTION OF THE DRAWINGS

FIG. 2 is a diagram illustrating an example structure of a color-image processing file used by the color-image processing file editing apparatus according to the first embodiment of the present invention.

FIG. 5 is a diagram illustrating an example of information embedded in a color-image processing file used by the color-image processing file editing apparatus according to the first embodiment of the present invention.

FIGS. 7A and 7B are diagrams illustrating examples of encryption and decryption executed on a color-image processing file by the color-image processing file editing apparatus according to the first embodiment of the present invention.

DESCRIPTION OF THE EMBODIMENTS

Various embodiments, features and aspects of the present invention shall now be described in detail in accordance with the accompanying drawings.

First Exemplary Embodiment

Figure 1:
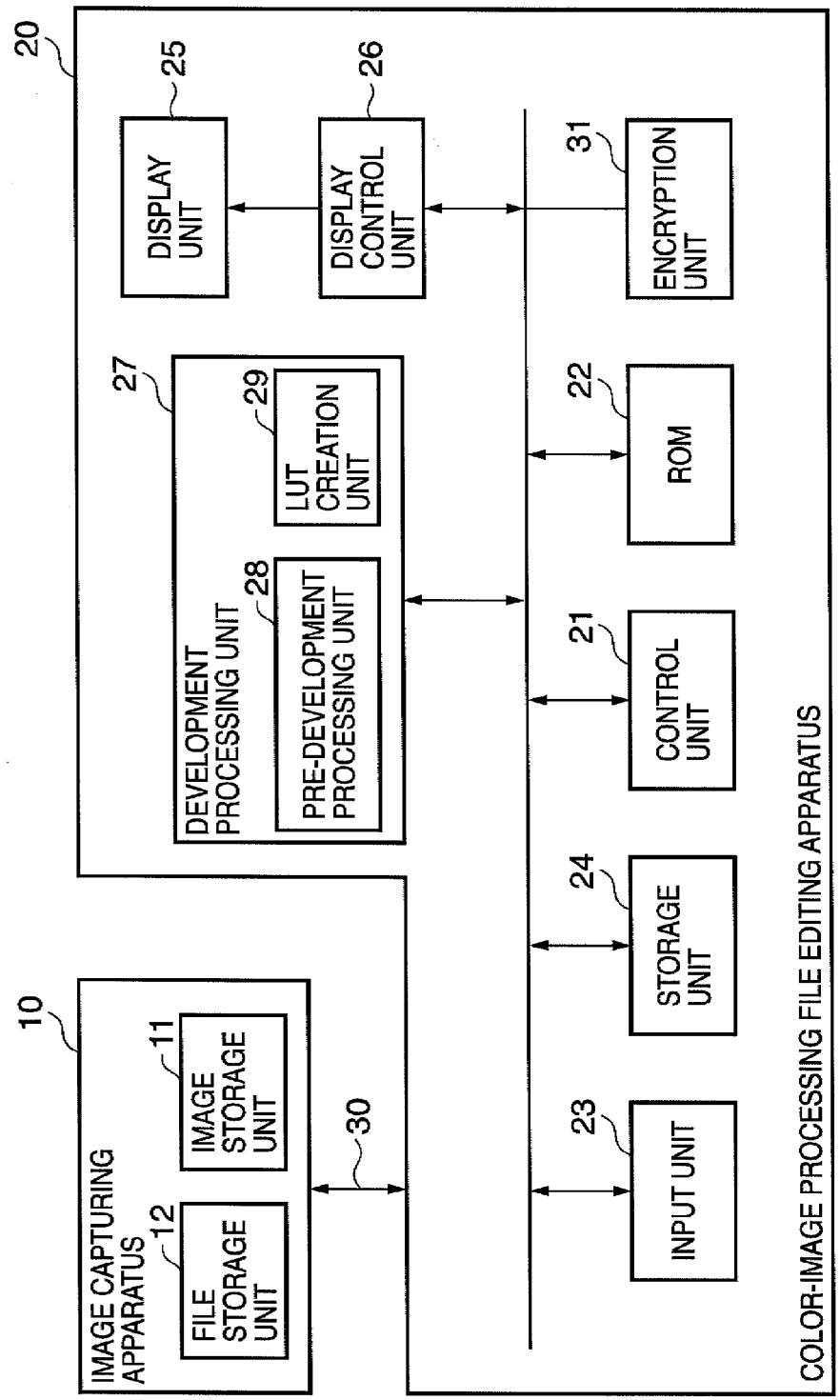
FIG. 1 is a diagram illustrating an example configuration of a color-image processing file editing system that employs a color-image processing file editing apparatus according to a first exemplary embodiment of the present invention.

FIG. 1 illustrates a color-image processing file editing system (shortened as "CIP file editing system") to which a color-image processing file (shortened as "CIP file") editing apparatus, serving as an example of the file processing apparatus according to a first embodiment of the present invention, has been applied. This color-image processing file editing system includes an image capturing apparatus 10, such as a digital camera, and a color-image processing file editing apparatus (shortened as "CIP file editing apparatus") 20 configured using a personal computer (hereinafter called a "PC"). The image capturing apparatus 10 includes at least an image storage unit 11 and a file storage unit 12. Other elements of the image capturing apparatus 10 are of no direct relation to the present invention and descriptions thereof shall therefore be omitted. When the CIP file editing system is being operated, the image capturing apparatus 10 and the CIP file editing apparatus 20 are connected by, for example, a USB cable 30.

In the present embodiment, color processing specified in the color-image processing file is assumed to include a converting process for one of saturation, brightness, hue, and gamma properties.

The CIP file editing apparatus 20 controls overall operations using a control unit 21, in accordance with a control program stored in a ROM 22. The CIP file editing apparatus 20 also includes an input unit 23, a storage unit 24, a display unit 25, and a display control unit 26. The input unit 23 includes a mouse, a keyboard, or the like; various instructions are input to the CIP file editing apparatus 20 through a user's manipulation of the mouse, keyboard, or the like. The display unit 25 displays various user interface screens. The display control unit 26 includes a display memory therewithin, and controls the display unit 25. The CIP file editing apparatus 20 further includes a development processing unit 27, which in turn includes a pre-development processing unit 28 and an LUT creation unit 29. Finally, 31 is an encryption unit that encrypts and decrypts the CIP file.

In the example described in the first embodiment, the CIP file editing apparatus 20 generates a CIP file, and the generated CIP file is set in the image capturing apparatus 10.

FIG. 2 illustrates the informational structure of the CIP file. In FIG. 2, 201 represents matrix operation coefficients for creating, for example, the 3D-LUT illustrated below:

$$R' = m00*R + m01*G + m02*RG + m03*RB + m04*BG + m05*RB + m06*RR + m07*GG + m08*BB + m09$$

$$G' = m10*R + m11*G + m12*RG + m13*RB + m14*BG + m15*RB + m16*RR + m17*GG + m18*BB + m19$$

$$B' = m20*R + m21*G + m22*RG + m23*RB + m24*BG + m25*RB + m26*RR + m27*GG + m28*BB + m29$$

Here, R, G, and B represent the R, G, and B values for the inputted image data; R', G', and B' represent the R, G, and B values of the image data that has undergone image processing; RG (and the like) represents the product of R and G; and furthermore, m00 to m29 represent matrix operation coefficients.

Reference number 202 is information regarding the edit history. More specifically, in the present embodiment the following information is included: a piece of edit history information for each editing event affecting a color that is performed by the CIP file editing apparatus 20; a piece of edit history display control information, associated with one or more pieces of the edit history information, that determines whether or not that associated piece (or those associated pieces) of the edit history is to be displayed in the display unit 25 of the CIP file editing apparatus 20; an ID of a user that performed editing; and a password for edit history display.

A piece of edit history information, and the associated piece of edit history display control information, user ID, and password corresponding thereto, are stored for each instance of editing (editing event). FIG. 2 shows an example in which N pieces of edit history information have been stored (where N may be set to any number). This edit history information is stored in a format that includes source RGB data, which is color-image data, and edited RGB data (8-bit data, with each value being from 0 to 255).

For example, a red with 100% saturation undergoes the change in data shown below when edited to reduce the saturation, wherein the following applies:
(source R data, source G data, source B data)=(255, 0, 0);
(edited R data, edited G data, edited B data)=(255, 50, 50)

The source and edited RGB data are not intended to be limited to 8-bit data; other bit numbers, such as 16, may be utilized as well. Furthermore, the technique for expressing color is not intended to be limited to RGB; for example, another technique, such as YUV, may be used.

Inputting a user ID and a password corresponding to each editing event makes it possible for the CIP file editing apparatus 20 to display, in the display unit 25, edit history information for which the edit history display control information had been set to "hide". Note that the matrix operation coefficients 201 and the edit history information, user IDs, and passwords indicated collectively by 202 as illustrated in FIG. 2 are stored in the storage unit 24.

Next, a user interface ("UI" hereinafter) screen for the CIP file editing apparatus 20 shall be described. A specific configuration of such a UI screen, displayed in the display unit 25, is illustrated in FIG. 3.

Figure 3:
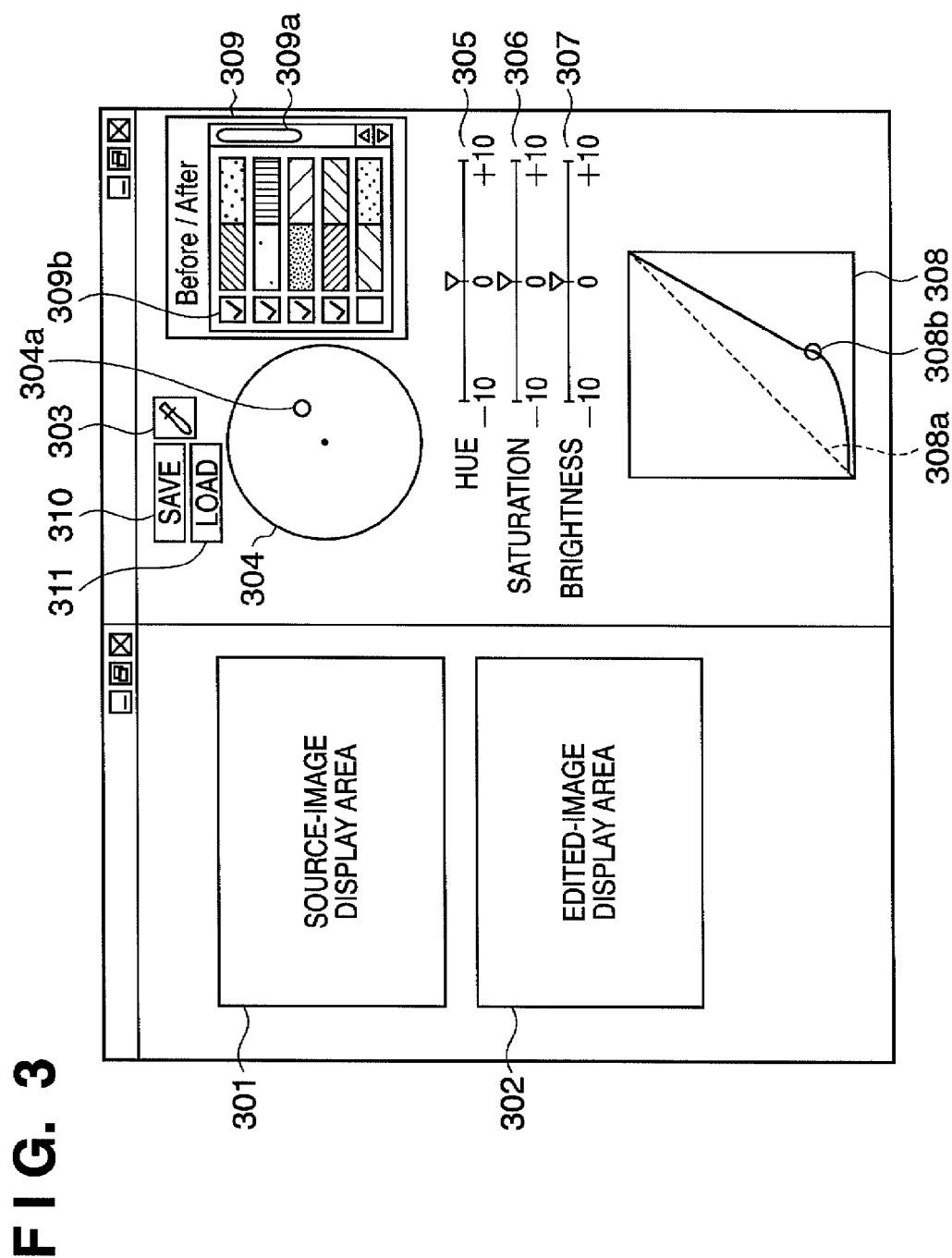
FIG. 3 is a diagram illustrating an example user interface of the color-image processing file editing apparatus according to the first embodiment of the present invention.

In FIG. 3, 301 represents a source-image display area that is referred to when editing a color-image processing file. When an image to be edited is dragged and dropped into the source-image display area 301 by manipulating the mouse of the input unit 23, that source-image is displayed in the source-image display area 301. Meanwhile, 302 represents an edited-image display area, in which is displayed the result of the image displayed in the source-image display area 301 being edited.

Reference numeral 303 represents an eyedropper tool button, whereas 304 represents what is known as a color wheel, in which the entire palette that can be expressed is displayed. The center of the color wheel 304 represents 0% saturation; the saturation grows progressively from the center until it reaches 100% at the outer periphery of the color wheel 304. Furthermore, a horizontal line extending from the center to the right side of the color wheel 304 is taken as 0°, and the angles from 0 to 359° formed in the counter-clockwise direction represent hues. Upon clicking the eyedropper tool button 303 and then using the mouse to click a pixel of a color to be edited in the source-image displayed in the source-image display area 301, the hue and saturation of the color of the clicked pixel are calculated, and a point 304a appears in the color wheel 304 on the corresponding color. The color to be edited can also be selected by directly clicking an arbitrary color in the color wheel 304, instead of or in addition to selecting a color to be edited from the source-image in the source-image display area 301. A color selected in this manner is displayed as a source color in the "Before" column of an edit history display area 309 shown in FIG. 3, which shall be described later.

Reference numeral 305 represents a slide bar for adjusting the hue of the selected color. The hue of the selected color can be edited by sliding the slide bar 305, where sliding the bar in the positive direction alters the hue of the selected color in the positive direction, and sliding the bar in the negative direction alters the hue of the selected color in the negative direction.

Reference numeral 306 represents a slide bar for adjusting the saturation of the selected color. The saturation of the selected color can be edited by sliding the slide bar 306, where sliding the bar in the positive direction increases the saturation of the selected color, and sliding the bar in the negative direction decreases the saturation of the selected color.

Moreover, reference numeral 307 represents a slide bar for adjusting the brightness of the selected color. The brightness of the selected color can be edited by sliding the slide bar 307, where sliding the bar in the positive direction increases the brightness of the selected color, and sliding the bar in the negative direction decreases the brightness of the selected color.

Still referring to FIG. 3, reference numeral 308 represents a γ (gamma) properties curve editing display area. As indicated by 308a, the source gamma properties curve is represented by a dotted line. By selecting and editing part of the source γ curve indicated by 308a, the gamma properties curve can be edited, as is indicated by, for example, an edited γ curve 308b. Although there is one editing point on the gamma editing curve shown in FIG. 3, editing with plural editing points is also possible.

Reference numeral 309 represents an edit history display area. When a selected source color is edited via the hue adjustment slide bar 305, the saturation adjustment slide bar 306, and the brightness adjustment slide bar 307, the source color is displayed on the left side (the "Before" column), whereas the edited color is displayed on the right side (an "After" column).

In FIG. 3, edit history information for a maximum of five editing events is displayed at any given time; edit history information for editing events beyond that number can be displayed by sliding a scroll bar 309a. Accordingly, edit history information for any number of editing events (and any number of colors) can be added. 309b represents edit history display control information. Pieces of edit history information for which this part is not checked (indicated by a V shape in FIG. 3) are set to be hidden, and thus the display thereof is limited even if the CIP file is reloaded after being saved.

To be more specific, the pieces of edit history information in the CIP file for which the edit history display control information was not checked at the time of saving the CIP file will not be displayed when the file is reloaded as long as the correct user ID and password corresponding thereto is not input. The edit history display control information 309b can be arbitrarily checked and unchecked by the user by clicking this part using the mouse of the input unit 23.

Reference numeral 310 represents a save button for saving the editing results for the image and generating a CIP file. 311 represents a load button for loading a CIP file that is to be re-edited.

Next, the flow of processing occurring when newly generating a CIP file using the CIP file editing apparatus 20 shall be described with reference to the flowchart in FIG. 4.

First, after the processing commences, in Step S401, an image file, for example, a RAW image file, referred to when generating the CIP file, is selected, dragged, and dropped into the source-image display area 301. Here, the RAW image file is selected from, for example, RAW image files stored in the image storage unit 11 of the image capturing apparatus 10. A RAW file is a file format created by a manufacturer to contain the (actual) raw data from the image capturing apparatus (e.g. a digital camera). In general, each manufacturer's format is proprietary, different and may vary from one model to another.

Here, various information for developing, as shown in FIG. 5, is embedded in the RAW image file shot by the image capturing apparatus 10. In FIG. 5, 501 represents pre-development process parameters, which shall be mentioned later. 502 and 503 are identical to 201 and 202 for the CIP file shown in FIG. 2, and thus descriptions thereof shall be omitted.

Figure 4:
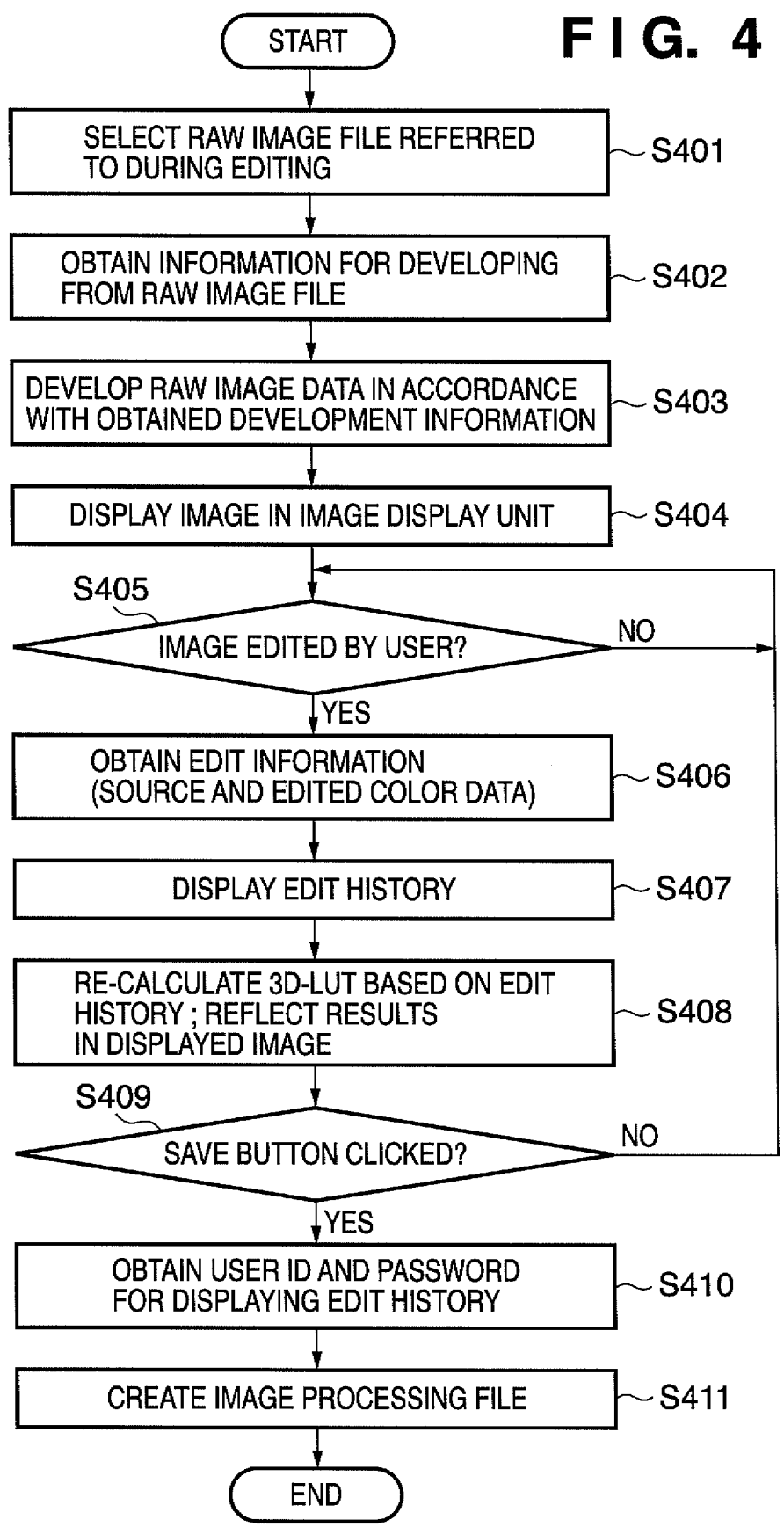
FIG. 4 is a flowchart illustrating an example method for newly creating a color-image processing file using the color-image processing file editing apparatus according to the first embodiment of the present invention.

Returning to the flowchart in FIG. 4, in Step S402, the information for developing shown in FIG. 5 and embedded in the RAW image file dragged and dropped in Step S401 is obtained. The obtained information for developing is stored, for example, in the storage unit 24. The procedure then moves to Step S403, where the RAW image file is developed using the obtained information for developing.

This developing is executed by the development processing unit 27; the operation thereof shall be described hereinafter with reference to the flowchart in FIG. 6.

First, after the processing commences, in Step S601, the pre-development processing unit 28 executes the pre-development process on the obtained RAW image file. In this pre-development process, a pixel-interpolation process is executed on an RGB Bayer-pattern (not shown) image, converting the image into an RGB 3-plane image. Then, white balance and color level adjustment, tone adjustment, brightness adjustment, gamma property adjustment, and so on are executed, thereby generating a pre-development processed image.

Next, in Step S602, the LUT creation unit 29 creates a 3D-LUT based on the aforementioned matrix operation coefficients 502, which have been prepared in advance. In the present case, the process of FIG. 6 is being carried out as part of the creation of a new CIP file in accordance with FIG. 4, and there is no edit history information 503 to be reflected in the 3D-LUT created in Step S602. For this reason Step S603 is skipped. In Step S603, the edit history 503 regarding the editing performed by the CIP file editing apparatus 20 is caused to be reflected in the created 3D-LUT. Incidentally, Step S603 is carried out when the FIG. 6 process is carried out as part of a developing operation in Step S806 in FIG. 8, to be described later.

Figure 6:
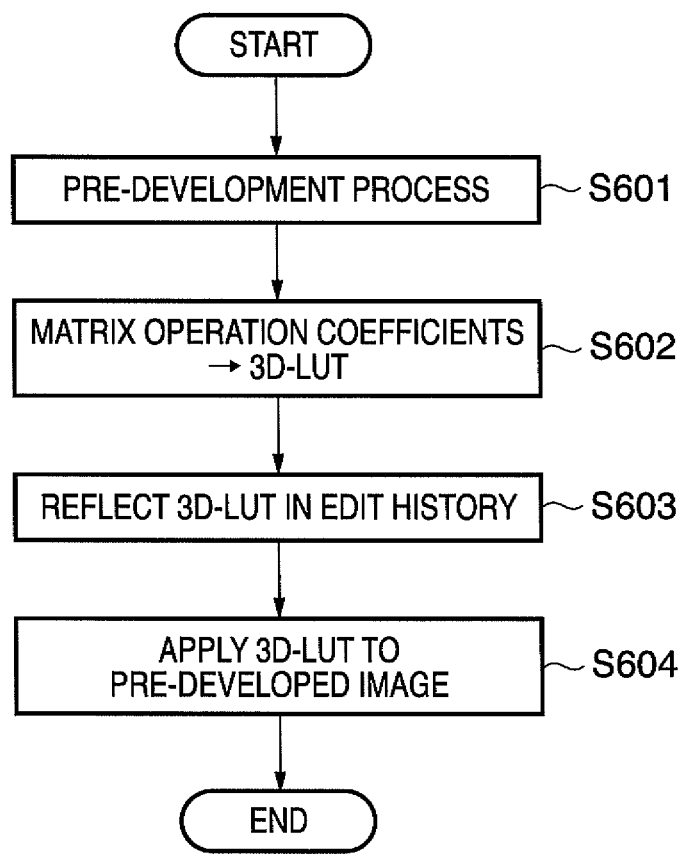
FIG. 6 is a flowchart illustrating an example image developing method executed using a color-image processing file created by the color-image processing file editing apparatus according to the first embodiment of the present invention.

Then, in Step S604, the 3D-LUT (in which the edit history of the CIP file has been reflected, if the process of FIG. 6 is being carried out when edit history information does exist) is applied to the pre-development processed image, which has been developed in advance. It is through such a process flow that an image, in which the edit history (if any) is reflected, is generated from a RAW image file.

Returning once again to the flowchart in FIG. 4, in Step S404, the developing process described above with reference to FIG. 6 is executed, and the resulting image is displayed in the source-image display area 301 indicated in FIG. 3. Then, as indicated by Step S405, the system stands by until an editing operation is performed by the user on the source-image shown in FIG. 3.

When an editing operation has been confirmed in Step S405, the procedure moves to Step S406, where the source and edited RGB color data is obtained. After this, the procedure moves to Step S407, where the source and edited colors are displayed as edit history information in the edit history display area 309 shown in FIG. 3.

Here, in the case where the user does not wish to disclose this edit history information to a third party when distributing the CIP file to that third party, s/he may uncheck the checkmarks (the V-shapes in FIG. 3) that have been added to the edit history display control information 309b associated with the edit histories shown in the edit history display area 309.

To be more specific, the checkmarks may be clicked, which will remove the checkmarks. By doing so, the pieces of edit history information corresponding to the checkmarks will subsequently not be displayed unless the corresponding user ID and password are input when the CIP file is to be edited once again, as described earlier. For this reason, the edit history will not be disclosed to a third party even if the CIP file is distributed to that third party. Because the display/hide settings for the edit histories can be arbitrarily set for each piece of edit history information, it is also possible to set only the edit histories that need not be disclosed when distributing the CIP file to be hidden. Moreover, when all edit histories are to be hidden, the checkmarks for the edit history display control information 309b corresponding to all edit histories may be removed.

Next, the procedure moves to Step S408, where a 3D-LUT is created in accordance with the edit history information so that the source colors are altered to the edited colors. The original RAW image file, which is the source image displayed in the source-image display area 301, is re-developed using the created 3D-LUT, and the resultant image is displayed in the edited-image display area 302.

The editing processes from Step S405 to Step S408 are repeated for each editing event (e.g. each selected color) until the save button 310 shown in FIG. 3 is clicked, as indicated by Step S409; for each editing event, a piece of edit history information and an associated icon, representing the content of the piece of edit history display control information associated with the piece of edit history information, are added to the edit history display area 309 and displayed therein.

When the save button 310 is clicked in Step S409, the procedure moves to Step S410, where a user ID and password input screen for displaying the edit histories appears; here, the user inputs his or her user ID and password using the input unit 23. The user ID and password are necessary when re-editing the CIP file, in order to display pieces of edit history information for which the edit history display control information checkmarks have been removed (i.e. the pieces of edit history information to be hidden) among the edit history information stored in the CIP file. If two or more pieces of edit history information have been added in the current editing session, the user need only enter his ID and password once, and this ID and password are registered in correspondence with all the pieces of edit history information. Of course, if the user wants to apply different passwords to different pieces of edit history information, he can also do so. The procedure then moves to Step S411, where a CIP file is generated in accordance with the CIP file structure shown in FIG. 2. After this, the process ends.

In the present embodiment the information stored in the CIP file specifically includes the following:

the pieces of edit history information displayed in the edit history display area 309 shown in FIG. 3;

the pieces of edit history information display/hide information, corresponding to the pieces of edit history information, set in the edit history display control information 309*b*; and a user ID and password for each piece of edit history information.

Furthermore, the CIP file also includes the matrix operation coefficients used when creating the 3D-LUT prior to the editing events applied in the current editing session. The user IDs and passwords input during these operations are added to the edit histories included in the CIP file, as shown in FIG. 2.

For example, N in FIG. 2 is 3 if three editing events (instances of editing) have been executed during the processing from the aforementioned Steps S401 to S410; the user IDs and passwords obtained in Step S410 through the input screen are associated with edit histories 1 to 3, respectively, and stored, as illustrated in FIG. 2.

Furthermore, encryption is executed by the encryption unit 31 so that the CIP file cannot easily be tampered with during storage. This encryption is carried out through, for example, the following procedure. The data of the CIP file is divided every four bits, and encrypted. The data obtainable prior to encryption is based on hexadecimals from 0 to F, but a predetermined encryption constant is added thereto, which results in encrypted data. To rephrase, encryption is executed using the following Formula 1:

Pre-encryption data+encryption constant=encrypted data  Formula 1

Then, the encrypted data can be decrypted by subtracting the encryption constant therefrom, as illustrated by Formula 2:

Encrypted data (pre-decryption data)−encryption constant=decrypted data  Formula 2

FIGS. 7A and 7B illustrate an example of encryption and decryption assuming the encryption constant is 5. Although the encryption constant is 5 in the present embodiment, the encryption constant is not intended to be limited to 5.

Furthermore, in the present embodiment, the encryption and decryption are carried out by the encryption unit 31 using the aforementioned procedures illustrated by Formulas 1 and 2; however, other procedures may be used instead. A CIP file can be newly generated through such a processing flow.

Figure 8:
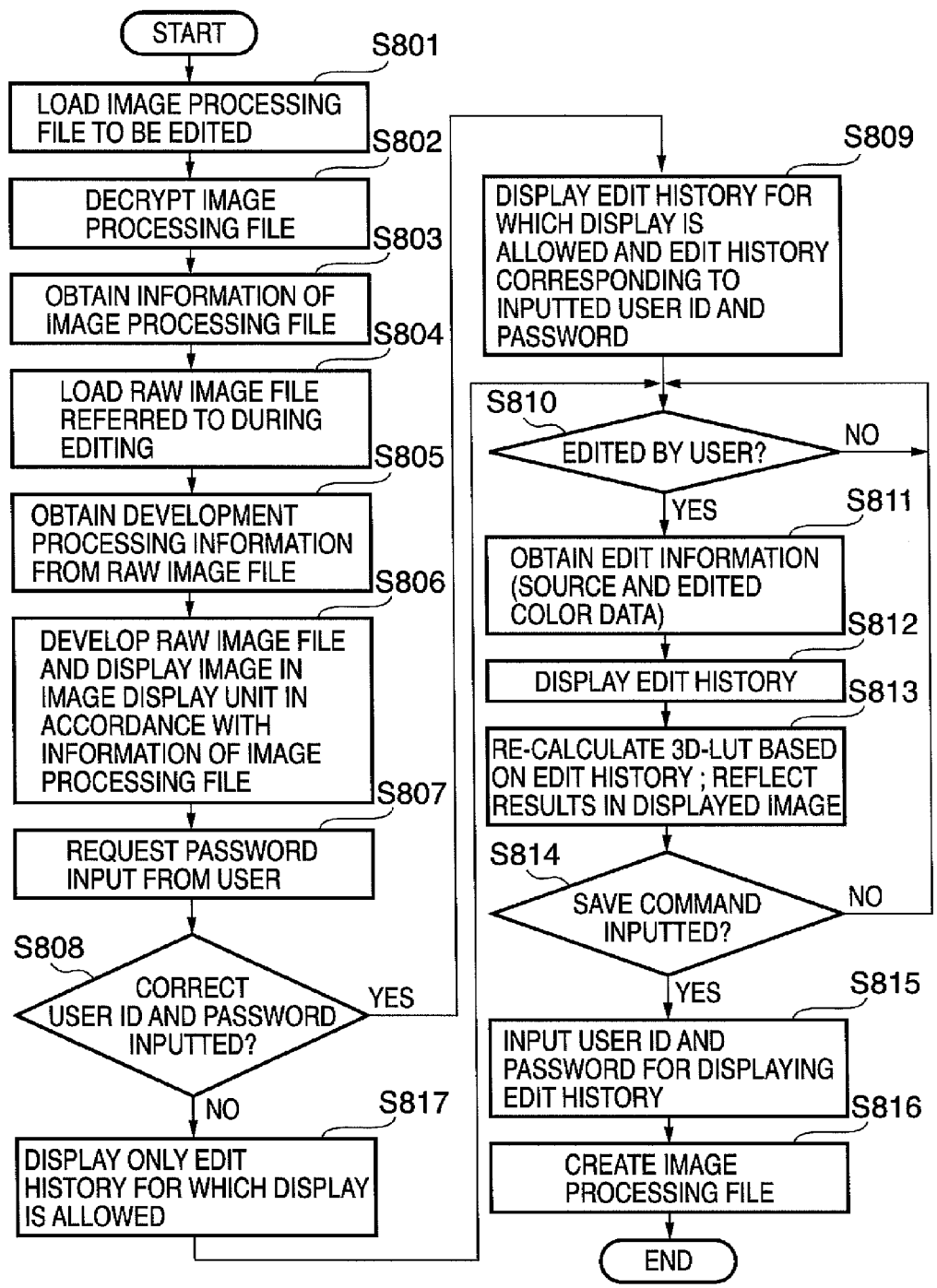
FIG. 8 is a flowchart illustrating an example method for re-editing a color-image processing file using the color-image processing file editing apparatus according to the first embodiment of the present invention.

Next, a method for loading a generated CIP file into the CIP file editing apparatus 20 and re-editing the CIP file shall be described with reference to the flowchart in FIG. 8. After the processing commences, in Step S801, the user first clicks the load button 311 in the UI screen illustrated in FIG. 3, and loads the CIP file to be edited.

The procedure then moves to Step S802, where the CIP file editing apparatus 20 decrypts the loaded CIP file. This decryption is carried out using the method described above. However, as described earlier, a different method than that described above may be used for the encryption and decryption. The procedure then moves to Step S803, where the information of the CIP file, shown in FIG. 2, is obtained and stored in the storage unit 24 of the CIP file editing apparatus 20.

Next, in Step S804, the RAW image file referred to when first creating the CIP file is selected, and this RAW image file is dragged and dropped into the source-image display area 301. After this, in Step S805, the CIP file editing apparatus 20 obtains the pre-development process parameters, shown in FIG. 5, which are embedded in the RAW image file referred to at the time of creating and/or first editing the CIP file.

As described above, a CIP file including the edit history information—as shown in FIG. 5—may be newly created when the RAW image file is processed for the first time by the file editing apparatus 20. Normally, the user will edit the color processing in one or more respects when first creating the CIP file using the file editing apparatus (outcome of Step S405 in FIG. 4 is "yes"), so the newly-created CIP file will include one or more pieces of edit history information. However, if the outcome of Step S405 in FIG. 4 is "no", a CIP file may be created with the part 503 blank for the time being.

The procedure then moves to Step S806, where the RAW image file is developed through the procedure illustrated in FIG. 6, using the pre-development process parameters obtained in Step S805 and the matrix operation coefficients for 3D-LUT creation and edit history information obtained from the CIP file in Step S803. In this case, edit history information does exist in the CIP file and Step S603 of FIG. 6 is not skipped. The image developed thereby is displayed in the source-image display area 301 shown in FIG. 3, as indicated in Step S806.

Next, in Step S807, a UI screen requesting the input of a user ID and password for displaying the edit history of the CIP file is displayed. The input of the user ID and password is confirmed in the following Step S808. If in Step S808 it is determined that the input user ID and password are correct, the procedure moves to Step S809. Then, in Step S809, the pieces of edit history information for which display is allowed (i.e. not password-restricted) and the pieces of edit history information for which display is not allowed (i.e. is password-restricted) but for which a corresponding user ID and password has been inputted are displayed in the edit history display area 309 of the display unit 25.

However, if the user ID and password input here are not correct, or have simply not been input, the procedure moves to Step S817, where only the pieces of edit history information for which display are allowed are displayed in the edit history display area 309; any pieces of the edit history pre-set to be hidden are not displayed.

Plural user IDs and passwords can be input in Step S808. In such a case, all pieces of edit history information corresponding to the plural inputted user IDs and passwords are displayed in Step S809. Of course, the pieces of edit history information for which display has been allowed are also displayed at this time.

Here, it is assumed that this CIP file is a file that has been created and possibly edited one or more times by the user him/herself. In this case, the user ID and password set in Step S410 of the flowchart in FIG. 4 are known, and thus all of the pieces of edit history information stored in this file can be displayed by inputting that user ID and password. On the other hand, if this CIP file has been created and/or edited by another person, the pieces of edit history information set to be hidden in Step S407 are not displayed to file editors who do not know the user ID and password of the previous creator or editor. This eliminates the annoyance of edit history resulting from editing performed by a third party being accidentally displayed, which in turn makes checking, editing, and the like easier.

Next, in Step S810, the system waits for the CIP file to be edited by the user. Once editing has taken place, the procedure moves to Step S811, where the source and edited RGB color data is obtained. Then, in Step S812, the source and edited RGB color data is displayed as edit history information in the edit history display area 309 shown in FIG. 3, as a continuation of the edit history information already displayed therein.

To rephrase, in Step S810, the user carries out further color process editing to add new pieces of edit history information capable of being additionally displayed in the edit history display area 309. For example, in one possible display format, five pre-existing pieces of edit history information are arranged vertically and displayed in the manner shown in FIG. 3, and a new piece of edit history information being added in the current editing session is displayed below the fifth pre-existing piece of edit history information.

Next, the procedure moves to Step S813, where a 3D-LUT is created in accordance with the edit history information so that the source colors are altered to the edited colors. Using that 3D-LUT, the RAW image file displayed in the source-image display area 301 is re-developed, and the resultant image is displayed in the edited-image display area 302.

Then, in Step S814, whether or not the save button 310 shown in FIG. 3 has been clicked is detected. Here, the editing process is repeated until the save button 310 is clicked, and edit histories are added to the edit history display area 309 and displayed with each repeat. When it has been determined that the save button 310 has been clicked in Step S814, the procedure moves to Step S815, where a user ID and password input screen for displaying the newly-added pieces of edit history information appears, and the user inputs a user ID and a chosen password.

The procedure then moves to Step S816, where the edited CIP file is stored. The stored CIP file has the CIP file structure described previously with reference to FIG. 5. In particular, it includes the aforementioned matrix operation coefficients that were included in the CIP file prior to editing, as loaded in Step S801. These matrix operation coefficients are coefficients used for creating a 3D-LUT prior to the edit history information hide/display information, user IDs, and passwords corresponding to the edit histories and the edit histories themselves being applied thereto. The stored CIP file also includes the edit history information displayed in the edit history display area 309 and the control information set by the edit history display control information 309b shown in FIG. 3.

Here, if the CIP file has already been edited by a different user, the pieces of edit history information, and the associated pieces of edit history display/hide information, user ID, and password corresponding thereto, regarding the editing performed by the other user have already been included in the CIP file. In this case, the pieces of edit history information, and the associated edit history display/hide information, user ID, and password corresponding thereto, generated for color-processing changes requested by the present user in the current editing session (Steps S801 to S815 in FIG. 8) are added to the information that is already stored, and are stored in such a manner. Of course, the user ID and password may be different from those already stored in the CIP file.

Furthermore, encryption is executed using the aforementioned procedure during storage of the CIP file so that the CIP file cannot easily be tampered with. The above has been a description of the flow of a method for re-editing a CIP file.

Figure 9:
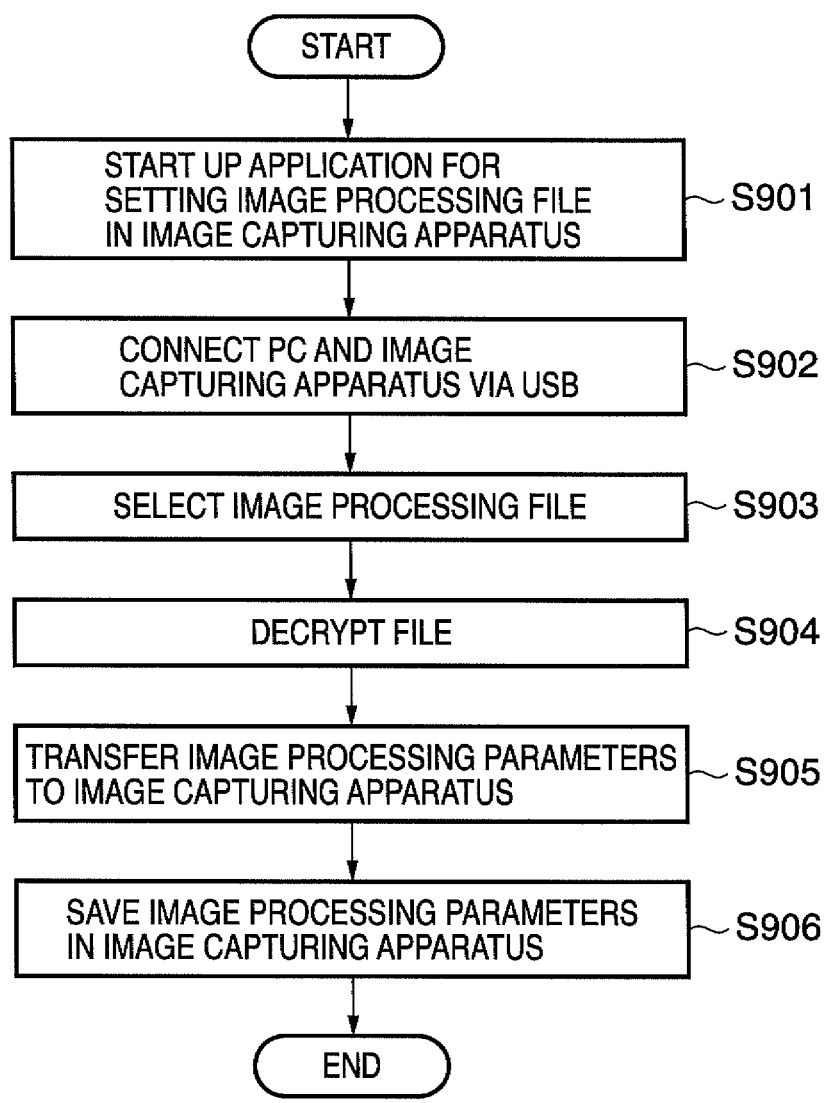
FIG. 9 is a flowchart illustrating an example method for setting a color-image processing file in an image capturing apparatus using the color-image processing file editing apparatus according to the first embodiment of the present invention.

Lastly, a method for setting (transferring) a CIP file into the image capturing apparatus 10 shall be described with reference to the flowchart in FIG. 9.

First, after the processing commences, in Step S901, an application program for setting the CIP file into the image capturing apparatus, capable of being run by the CIP file editing apparatus 20, is started up. The procedure then moves to Step S902, where the CIP file editing apparatus 20 and the image capturing apparatus 10 are connected using a connection device such as, for example, a USB device.

Next, in Step S903, a CIP file stored and saved in the storage unit 24 of the CIP file editing apparatus 20 is selected. In Step S904, the selected CIP file is decrypted by the application program, using the aforementioned procedure. Then, in Step S905, the data making up the information of the CIP file, as shown in FIG. 2, is extracted from the decrypted CIP file, and is transferred to the image capturing apparatus 10. Lastly, in Step S906, the transferred data is stored in the file storage unit 12 of the image capturing apparatus 10, with being associated with a new shooting mode, and setting of the CIP file in the image capturing apparatus 10 finishes. It is also possible to set plural CIP files in the image capturing apparatus 10 by repeating the above processing.

As described thus far, with the CIP file editing apparatus according to the first embodiment of the present invention, it is possible to increase the shooting modes of the image capturing apparatus 10 by setting new CIP files corresponding to new shooting modes in the image capturing apparatus 10. It is also possible to impart limitations on the display of edit history information corresponding to the new shooting modes by providing edit history display/hide information per instance of edit history. Furthermore, it is possible to prevent a CIP file corresponding to a newly-set shooting mode from being improperly tampered with by setting an edit history display password.

Second Exemplary Embodiment

A second embodiment describes an example in which a CIP file is applied to a RAW development application program. The structure of the CIP file, the GUI for editing the CIP file, and the flow of editing the CIP file are identical to those described in the first embodiment, and thus descriptions thereof shall be omitted.

By using a RAW development application program installed in a personal computer (called a "PC" hereinafter) (not shown) to develop a RAW image file shot by an image capturing apparatus 10, the RAW image file can be developed having altered various elements of image processing, such as the hue, saturation, brightness, contrast, and so on of the colors. In other words, the RAW development application program can develop a RAW image file using image processing characteristics stored in advance in a CIP file, by using a CIP file stored in a file storage unit 12 of the image capturing apparatus 10. In this case, the PC and the image capturing apparatus 10 are connected by a USB cable.

Figure 10:
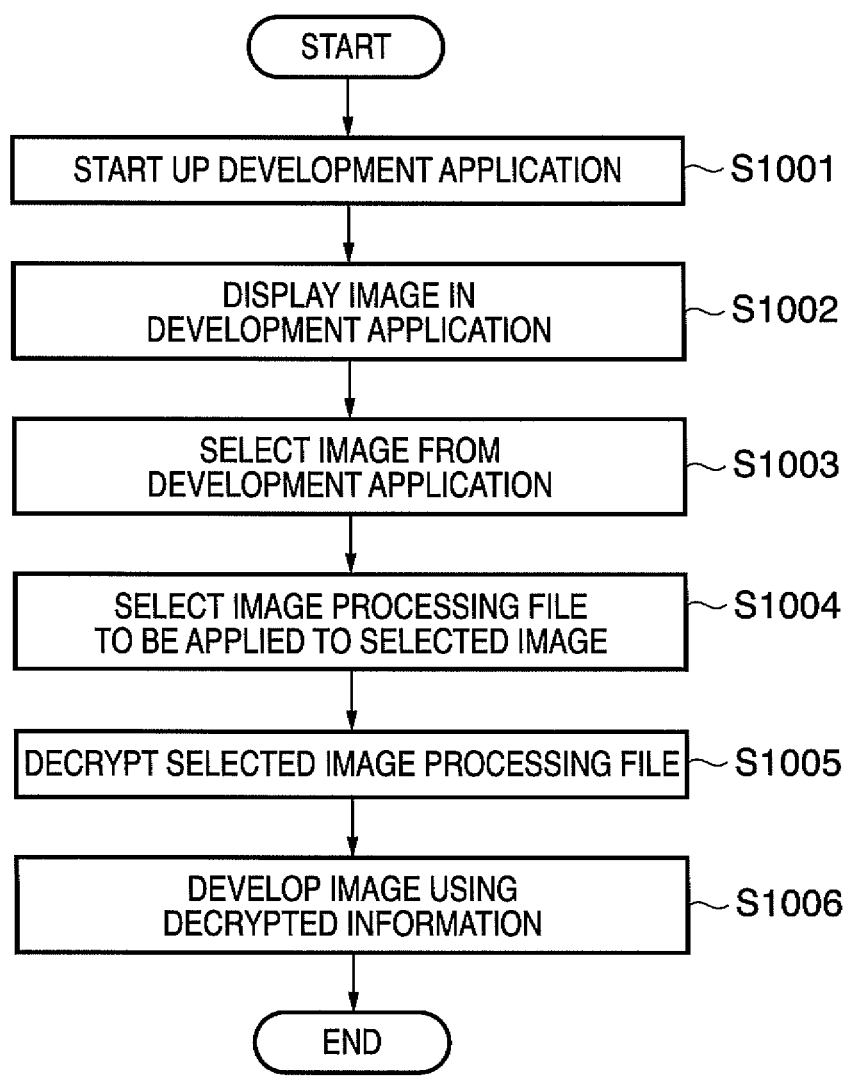
FIG. 10 is a flowchart illustrating an example image developing method executed using an encrypted color-image processing file created by a color-image processing file editing apparatus according to a second embodiment of the present invention.

A method for applying a CIP file set in the image capturing apparatus 10 to the RAW development application program running on a PC shall be described with reference to the flowchart in FIG. 10.

First, after the processing commences, in Step S1001, the RAW development application program is started up on the PC. Next, the procedure moves to Step S1002, where, after the RAW development application program has started up, a list of images in a selected folder stored in an image storage unit 11 is displayed in a display unit (not shown) of the PC.

Next, the procedure moves to Step S1003, where an image on which development processing is to be performed is selected by a user from the displayed list. Once an image has been selected, a CIP file created in advance using the aforementioned procedure and set in the file storage unit 12, which is to be applied to the image, is selected in Step S1004. Then, when the CIP file is selected, the procedure moves to Step S1005, where the CIP file is decrypted using the aforementioned procedure. After this, in the same manner, the procedure moves to Step S1006, where the image is developed using the aforementioned CIP file information.

Note that the abovementioned Steps S1001 to S1006 can also be executed by a CIP file editing apparatus 20 instead of a PC. In this case, it is furthermore possible to re-edit the CIP file.

According to the second embodiment of the present invention, a CIP file edited using the CIP file editing apparatus 20 and set in the file storage unit 12 of the image capturing apparatus 10 can be loaded into a PC on which the RAW development application program is running, and can be applied to the development process.

According to the first and second embodiments of the present invention as described thus far, the editor of a CIP file can select whether or not to disclose the edit history of the CIP file to a third party. Furthermore, the CIP file can easily be re-edited at any time, and the copyright thereof can be protected even when providing the CIP file to a third party.

By making it possible to edit the saturation, brightness, hue of the colors, and gamma properties in the image processing characteristics of the CIP file, it is possible to set shooting modes that comply with the various preferences of users. Furthermore, the edit history of the CIP file can be partially disclosed as well. Even if edit history display control information in the CIP file has been set to "hide", the edit history can once again be referred to by the editor inputting a password. Finally, it is possible to tamper with the data of the CIP file for which the edit history has been hidden and forcefully reading the edit history difficult.

Furthermore, the present invention can also be implemented by supplying, to a system or apparatus, a storage medium in which the program code for software that realizes the functions of the aforementioned embodiments has been stored; in other words, the object of the present invention can also be achieved through a computer (or CPU, MPU, or the like) of the system or apparatus to read out and execute the program code stored in the storage medium. In such a case, the program code itself read out from the storage medium implements the functionality of the aforementioned embodiments, and the storage medium in which the program code is stored composes the present invention. A flexible disk, a hard disk, an optical disk, a magneto-optical disk, a CD-ROM, a CD-R, magnetic tape, a non-volatile memory card, a ROM, and the like are examples of storage media that can be used to supply the program. It is also possible to supply a program embodying the invention carried by any suitable transmission medium such as a signal.

Furthermore, not only can the functionality of the aforementioned embodiments be implemented by the computer executing the read-out program code, but an OS or the like running on that computer can also execute part or all of the actual processing based on instructions from that program code. Through this, the scope of the present invention also includes the case where the functionality of the aforementioned embodiments is realized through this processing.

Furthermore, the present invention can also be implemented by writing the program code read out from the recording medium into a memory provided in a function expansion board installed in the computer or a function expansion unit connected to the computer. Accordingly, a CPU or the like included in the expansion board or expansion unit performs all or part of the actual processing based on instructions included in the written program code, and the functions of the aforementioned embodiment may be implemented through that processing. This also falls within the scope of the present invention.

Another aspect of the present invention relates to a CIP file. Such a CIP file, when processed by a color-image processing apparatus, causes the apparatus to apply color processing represented by the file to an image. Such a CIP file may be provided by itself or on a carrier medium. The carrier medium may be a recording medium such as a memory card or stick, or may be a transmission medium such as a signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2007-082748, filed on Mar. 27, 2007 and No. 2007-341120, filed on Dec. 28, 2007, which are hereby incorporated by reference herein their entirety.

What is claimed is:

1. A file processing apparatus for creating and/or editing a color-image processing file representing color processing to be applied to an image by using a controller of a computer, the apparatus comprising:

a generating unit, implemented by the controller, configured to generate edit history information relating to a color-processing change requested by a user and to generate control information for controlling whether or not to display the edit history information; and a recording unit, implemented by the controller, configured to record both the edit history information and the control information in the color-image processing file, wherein the control information includes information indicating whether or not authentication is required to display the edit history information, wherein the generating unit generates a piece of edit history information each time the color processing is changed, wherein a piece of the control information is associated with one or more generated pieces of the edit history information and controls whether to display the one or more generated pieces of the edit history information, wherein a first piece of the edit history information created by a first user is displayed to the first user regardless of a corresponding first piece of the control information and a second piece of the edit history information created by a second user is displayed to the first user based on a corresponding second piece of the control information, and wherein the recording unit records both the generated pieces of the edit history information and the generated pieces of the control information in the color-image processing file.

2. The file processing apparatus according to claim 1, wherein the recording unit includes a file creation unit configured to create a new color-image processing file including the edit history information and the control information.

3. The file processing apparatus according to claim 1, wherein the recording unit includes an existing file processing unit configured to add the edit history information and the control information to an existing color-image processing file.

4. The file processing apparatus according to claim 1, further comprising a use control unit, implemented by the controller, configured to control the control information recorded in an existing color-image processing file to control display of the edit history information recorded in the existing color-image processing file.

5. The file processing apparatus according to claim 4, wherein the use control unit includes a display control unit to control whether or not to display the edit history information according to the control information.

6. The file processing apparatus according to claim 5, wherein a password is associated with each piece of edit history information, and the display control unit, when a correct password associated with a piece of edit history information is inputted, displays the piece of edit history information regardless of the control information.

7. The file processing apparatus according to claim 5, further comprising an editing unit, implemented by the controller, configured to permit the user to edit the color processing represented by the color-image processing file while the display control unit displays at least one piece of the edit history information to the user.

8. The file processing apparatus according to claim 1, wherein the authentication includes verifying a password.

9. The file processing apparatus according to claim 1, wherein the color processing includes a converting process for one of saturation, brightness, hue, and gamma properties.

10. The file processing apparatus according to claim 1, further comprising an encryption unit, implemented by the controller, configured to encrypt the color-image processing file.

11. The file processing apparatus according to claim 1, further comprising a file transfer unit, implemented by the controller, configured to transfer the color-image processing file to an image capturing apparatus connected to the file processing apparatus.

12. The file processing apparatus according to claim 1, wherein the control information is not used for restricting use and editing of the color-image processing file.

13. A file processing method utilized in a file processing apparatus for creating and/or editing a color-image processing file representing color processing to be applied to an image, wherein the apparatus includes a generating unit configured to generate edit history information relating to a color-processing change requested by a user and to generate control information for controlling whether or not to display the edit history information; and a recording unit configured to record both the edit history information and the control information in the color-image processing file, the method comprising:

generating edit history information relating to a color-processing change requested by the user and generating control information for controlling whether or not to display the edit history information; and recording both the edit history information and the control information in the color-image processing file, wherein the control information includes information indicating whether or not authentication is required to display the edit history information, wherein, in the step of generating, a piece of edit history information is generated each time the color processing is changed, wherein a piece of the control information is associated with one or more generated pieces of the edit history information and controls whether to display the one or more generated pieces of the edit history information, wherein a first piece of the edit history information created by a first user is displayed to the first user regardless of a corresponding first piece of the control information and a second piece of the edit history information created by a second user is displayed to the first user based on a corresponding second piece of the control information, and wherein, in the step of recording, both the generated pieces of the edit history information and the generated pieces of the control information are recorded in the color-image processing file.

14. A non-transitory computer-readable storage medium containing computer-executable instructions for performing a program, when loaded into a computer, the computer as a file processing apparatus creates and/or edits a color-image processing file representing color processing to be applied to an image, the storage medium comprising:

computer-executable instructions for generating edit history information relating to a color-processing change requested by a user and for generating control information for controlling whether or not to display the edit history information; and computer-executable instructions for recording the edit history information and the control information in the color-image processing file, wherein the control information includes information indicating whether or not authentication is required to display the edit history information, wherein, in the step of generating, a piece of edit history information is generated each time the color processing is changed, wherein a piece of the control information is associated with one or more generated pieces of the edit history information and controls whether to display the one or more generated pieces of the edit history information, wherein a first piece of the edit history information created by a first user is displayed to the first user regardless of a corresponding first piece of the control information and a second piece of the edit history information created by a second user is displayed to the first user based on a corresponding second piece of the control information, and wherein, in the step of recording, both the generated pieces of the edit history information and the generated pieces of the control information are recorded in the color-image processing file.

* * * * *